UNITED STATES PATENT OFFICE.

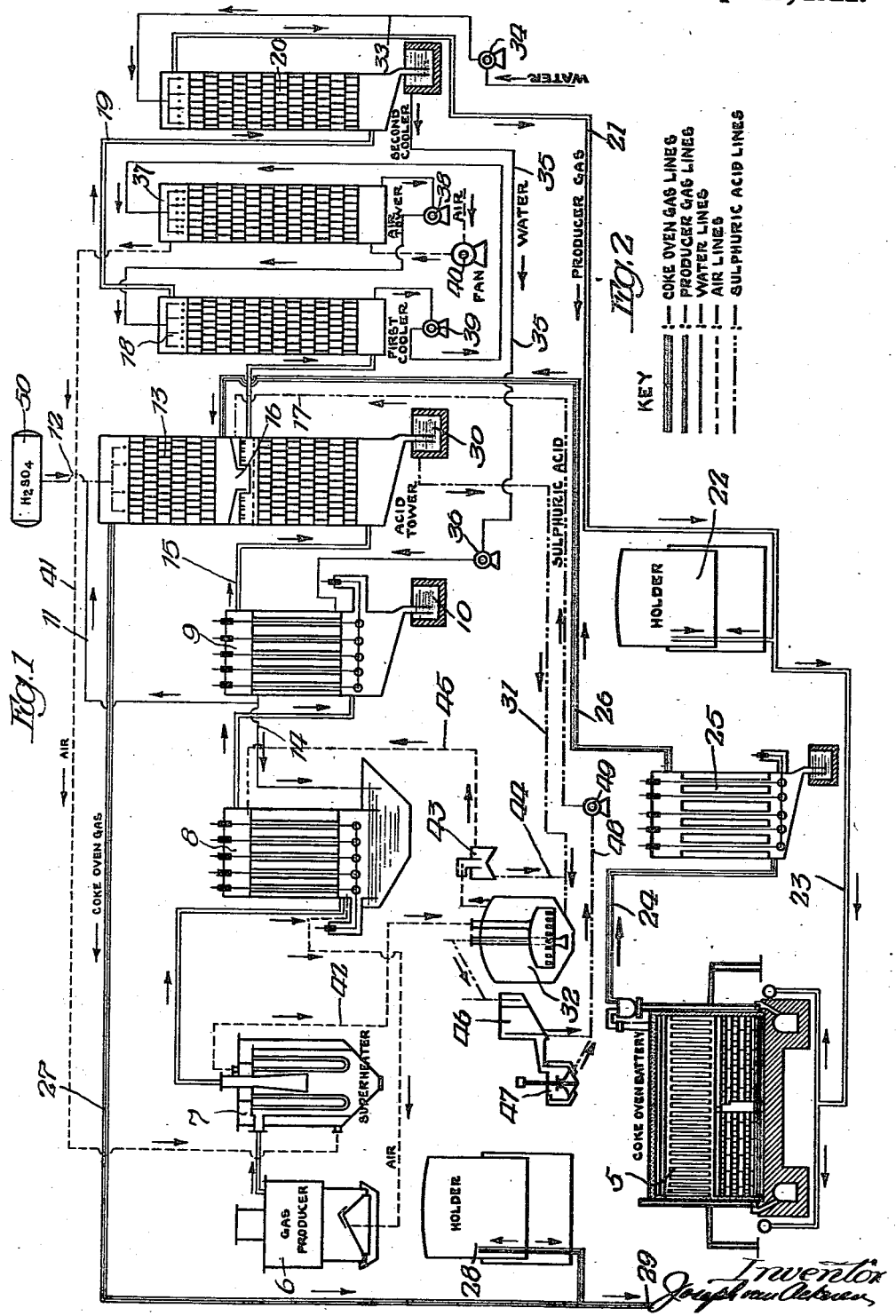

JOSEPH VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,477.  Specification of Letters Patent.  Patented Apr. 19, 1921.

Application filed August 25, 1919. Serial No. 319,733.

*To all whom it may concern:*

Be it known that I, JOSEPH VAN ACKEREN, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of ammonia from ammonia and tar charged gas and has for one of its objects the efficient production of a clean dust-free and high-grade tar, and for a further object the recovery of ammonia as a high-grade ammonium sulfate, with great economy of heat, without the necessity of employing outside steam, and with simplicity and directness in the operation of the apparatus.

The invention is of particular utility in connection with a process for the recovery of tar and ammonia from producer-gas and from coke-oven gas, embodying a combined production of high grade ammonium sulfate derived from the ammonia of both the producer-gas and the coke-oven gas in a unitary operation, as disclosed in my prior Patent No. 1,307,571, dated June 24, 1919. For convenience, the present description will be confined to this particular use of the invention; it will be understood, however, that the invention is capable of other applications, for example it may be applied to one of these gases, or gas, otherwise derived from the carbonization of coal, and it is manifest that the invention is by no means limited in scope to the particular application herein described. The invention may also have such other objects and results as are found to obtain in the processes hereinafter set forth and claimed.

In the accompanying drawings Figure 1 is a conventional diagram illustrating an embodiment of the invention in a preferred arrangement of apparatus for practising its process.

Fig. 2, is a key to the symbols employed in the various lines that show the connections between the apparatus indicated in Fig. 1.

Referring to the drawings, there is indicated at 5, a coke-oven battery from which coke-oven gas is derived and which is fired with producer-gas derived from the gas-producer 6. The evolved producer-gas from the gas-producer 6 passes first to a super-heater 7, in which it flows in counter-current with air that is going to the ammonia-saturator 32; the producer-gas entering the super-heater 7 is still at a very high temperature, about 450° C., and its water saturation point is only about 80° C, and therefore it is still greatly super-heated with respect to its water and tar, and this, and its other vaporizable content, are carried as vapor into and through the super-heater 7. The air, as it enters the super-heater 7, is saturated at a temperature of about 73° C., and as a result of the heat interchange effected by the passage of the relatively high-temperature gas and the relatively low-temperature air through this super-heater, the producer-gas issues with its temperature reduced to about 280° C., and the air issues with its temperature raised to about 395° C.

The partially-cooled but still hot producer-gas from the super-heater 7, still carrying its water and tar as vapor, passes to the electrical dust precipitator 8 in which such gas is freed from dust and other solid impurities in its current; in said electrical dust precipitator the gas also flows in counter-current with the saturated-air that is going to the gas-producer 6. The saturated-air enters the electrical dust precipitator 8 at about 83° C., and as a result of the heat interchange between the gas and saturated-air in the electrical dust precipitator, the air emerges from said precipitator with its temperature raised to about 250° C.; the gas emerges from the precipitator with its temperature reduced to about 120° C.

From the electrical dust precipitator 8, the still super-heated producer-gas passes to the electrical tar precipitator 9 for the precipitation of the tar, and in the tar-precipitator 9 the gas flows in counter-current with water that is discharged from the second-stage final-cooler 20; as a result of the heat interchange between the producer-gas and the water in the electrical tar precipitator, the gas emerges with its temperature cooled down to about 80° C. At about 120° C. the tar begins to drop out of the gas and the precipitation of tar continues until the gas is reduced to a much lower temperature, at which practically all of the tar will have been precipitated from the gas. As the producer-gas enters the tar-precipitator 9 at about 120° C. and discharges therefrom at about 80° C., said gas passes through a range of temperatures in the electrical tar precipitator 9, most effective for tar-precipitation and all of the tar is precipitated in the tar-precipitator 9. The clean tar so precipitated discharges into a tar tank 10. If desired, a portion of the warm water discharged from the electrical tar precipitator 9 may pass through a water-line 11 to the acid-line 12 through which acid-solution is conducted into the top of the hot acid-washer tower 13, thereby somewhat diluting the acid-solution, although raising its temperature, for purposes which will hereinafter appear. The remainder of the warm water from the electrical tar precipitator 9 may pass through the water-line 14, to a trough at the bottom of the electrical dust precipitator 8, and from there be discharged into a sewer, along with the dust and other solid impurities precipitated from the gas in said dust-precipitator.

The tar-freed producer-gas passes from said tar-precipitator 9, through the gas-line 15 to the hot acid-washer tower 13, which it enters at a temperature of about 80° C., i. e., at about its saturation-point. If desired, the hot acid-washer tower may be divided into upper and lower compartments, the upper compartment for the coke-oven gas, as hereinafter set forth, and the lower compartment for the producer-gas, said compartments being separated from each other by an ammonium sulfate solution seal, as indicated diagrammatically at 16. In said acid-washer 13, the ammonia is absorbed from the producer-gas and the ammonia-freed producer-gas leaves the acid-washer at a temperature of about 70° C., the gas thus may be cooled below its dew-point in the acid-washer, with the result that water is precipitated from the gas and the ammonia-absorbing acid solution that is flowing through said acid-washer is somewhat diluted, the excess of water in said solution being subsequently utilized for saturating the highly-superheated air that is conveyed to the ammonia-saturator 32; and no water is picked up by the gas in passing through said acid washer, and so there is no precipitation of ammonium sulfate in said acid washer.

Thence, the ammonia-freed gas flows through the gas-line 17 to the first-stage final-cooler 18 through which it flows in counter-current with warm water that enters said cooler at about 50° C. In this cooler, the gas is cooled to about 65° C., and to a great extent dehydrated, and thence passes through the gas-line 19 to the second-stage final-cooler 20, through which it passes in counter-current with cold water and issues further dehydrated and cooled down to a temperature of about 25° C. The clean, cool, and relatively dry producer-gas is drawn off through the gas-line 21, and thence is forwarded to the producer-gas holder 22, and on through the producer-gas line 23 to the before-mentioned coke-ovens 5, in which such producer-gas is burned to provide the heat for the coking of the charges in said ovens.

The coke-oven gas discharges from the coke-ovens 5 and passes through the gas-line 24 to the electrical tar-precipitator 25, at a temperature of about 80° C., in which the tar contained in the coke-oven gas is precipitated. From said precipitator 25, the tar-freed, ammonia-charged coke-oven gas passes through a gas-line 26, at or about its dew point, to the upper coke oven-gas chamber of the hot acid-washer tower 13 and in said chamber, the fresh acid-solution absorbs the ammonia from the coke-oven gas. During the absorption of the ammonia from the coke-oven gas, the temperature of the gas may be reduced below the dew-point of the gas, so that water is precipitated in the ammonia-absorbing acid-solution, increasing the temperature of the solution though diluting it somewhat to add a further supply of water for the saturation of the highly preheated air in the ammonia-saturator. From the hot acid-washer tower 13, the coke-oven gas, freed of its tar and ammonia, passes through a gas-line 27 to the gas-holder 28, and thence through a further gas-line 29 to whatever service it may be employed in.

The acid-solution charged with the ammonia absorbed from the coke-oven gas may pass from the upper coke-oven gas chamber of the acid-washer 13, through the seal 16 and commingle with the ammonia-absorbing acid-solution in the lower producer-gas chamber of said acid-washer. From said acid-washer 13, the commingled ammonia-charged acid solution of the coke-oven gas and of the producer-gas, carrying along with it the water essential for saturating the highly-superheated air in the ammonia-saturator 32, discharges into a drain-tank 30 and thence passes through an acid-line 31 to said ammonia-saturator.

The before-mentioned second-stage final-cooler 20 is cooled by fresh water continuously supplied through a water-line 33 by the water-pump 34, and, from this second-stage final-cooler, the water passes through a water-line 35 and is forwarded by a pump 36 to the electrical tar precipitator of the producer-gas, where said water is utilized, as hereinbefore mentioned, for cooling the producer-gas. The first-stage final-cooler 18, however, receives its warm water at a temperature, as before mentioned, of about 50° C., from the air-saturator tower 37, from which said water is drawn by the warm-water pump 38; and the water issuing from said first-stage final-cooler 18 has a temperature of about 80° C., and is forced by the hot water-pump 39 to the top of the said air-saturator tower into which it is sprayed—there being, as just mentioned, a constant recirculation of water through said first-stage final-cooler and said air-saturator. The air to be saturated and heated is forced into said air-saturator tower by the air fan 40, and enters the tower at a temperature of about 25° C. The air leaves the tower saturated at a temperature of about 73° C., and passes through the air line 41 to the before mentioned superheater 7, through which it flows in counter-current with the hot producer-gas from the producer.

As it issues from said superheater 7, the air has a temperature of about 395° C., and passes through an air-line 42 to the before-mentioned ammonia-saturator 32. This highly preheated air coming from the superheater absorbs sufficient water from the diluted ammonia-charged acid-solution that is discharged into said saturator through the acid-line 31 to precipitate the ammonium sulfate in the saturator and when said air issues from the saturator, with its temperature reduced to about 83° C., it carries with it sufficient water-vapor for the gasification of the coal in the producer, without the necessity of adding outside steam. The air issuing from the saturator 32, passes to an acid-separator 43 in which it is freed from any adhering particles of acid, the latter being discharged through a reflux-line 44, leading to the acid-line 31 going to the saturator. The acid-freed saturated air from the separator 43 flows through an air-line 45 to the before mentioned electrical dust precipitator 8 for the producer-gas, through which it flows in counter-current with the hot producer-gas. Issuing from said precipitator, the air has a temperature of about 250° C., and passes to the grate of the producer, as before mentioned.

The ammonium sulfate liquor and acid-solution from the saturator are discharged onto a drain table 46, and thence into a centrifugal-drier 47. From the centrifugal-drier 47, the ammonium-sulfate is discharged and conveyed, in any preferred manner, to the storage pile of the by-product house. The ammonium sulfate so discharged has the dry, clean, and large crystal character, with high ammonia content, of the high-grade ammonium sulfate that may be derived from the saturator-process of coke-oven gas. The drain from the table 46 and drier 47 flows into a return acid-line 48 and the recovered acid is forced by an acid-pump 49 through said return acid-line to the producer-gas chamber of the acid-washer 13. The coke-oven gas chamber is continuously supplied with fresh-acid solution, from the acid-tank 50.

The water essential for saturating the highly super-heated air in the ammonia-saturator 32 may be derived by cooling the producer-gas below its dew-point in the acid-washer, or by cooling the coke-oven gas below its dew-point in the acid-washer, or by adding water to the acid-solution through the water-line 11, as shown on the diagram. Any combination or all of these expedients may be employed, as can be readily determined by practice.

One reason for the great heat economy of the above set-forth process is the elimination of outside steam for charging the air with water-vapor, the necessary heat and steam being derived from the process itself. The apparatus, furthermore, is greatly simplified, in that primary coolers for the coke-oven gas, a reheater for the coke-oven gas and an ammonia-still are eliminated.

The processes of the invention may be practised in various ways, other than the particular embodiment that has been described for purposes of illustration, and still be within the scope and subject matter of the claims hereinafter made.

What is claimed is:

1. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated-air that is going to the producer; then electrically precipitating the tar from the gas; then passing the tar-freed producer-gas, at about its saturation-temperature, through a dilute acid-wash to absorb the ammonia from the gas and further diluting the mother-liquor in said acid-wash by precipitating water from such gas; then passing the producer-gas through final-cooling and dehydrating stages; heating and water-charging the air going to the aforesaid primary cooling operation by passing such air in counter-current with hot water from the final cooling of the gas; passing tar-freed coke-oven gas through an acid-wash supplied with dilute fresh acid-solution to absorb the ammonia and further diluting the mother-liquor in such acid-wash by precipitating water from the coke-oven gas; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the second gas-cooling operation; substantially as specified.

2. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated-air that is going to the producer; then electrically precipitating the tar from the gas; then passing the tar-freed producer-gas, at about its saturation-temperature, through a dilute acid-wash to absorb the ammonia from the gas and further diluting the mother-liquor in said acid-wash by precipitating water from such gas; passing tar-freed coke-oven gas through an acid-wash supplied with dilute fresh acid-solution to absorb the ammonia and further diluting the mother-liquor in such acid-wash by precipitating water from the coke-oven gas; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the second gas-cooling operation; substantially as specified.

3. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated-air that is going to the producer; then electrically precipitating the tar from the gas; then passing the tar-freed producer-gas, at about its saturation-temperature, through a dilute acid-wash to absorb the ammonia from the gas and further diluting the mother-liquor in said acid-wash by precipitating water from such gas; passing tar-freed coke-oven gas through an acid-wash supplied with dilute fresh acid-solution to absorb the ammonia; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the second gas-cooling operation; substantially as specified.

4. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated air that is going to the producer; then electrically precipitating the tar from the gas; then passing the tar-freed producer-gas, at about its saturation-temperature, through a dilute acid-wash to absorb the ammonia from the gas; passing tar-freed coke-oven gas through an acid-wash supplied with dilute fresh acid-solution to absorb the ammonia and further diluting the mother-liquor in such acid-wash by precipitating water from the coke-oven gas; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the second gas-cooling operation; substantially as specified.

5. In a process for the recovery of tar and ammonia from producer-gas and cove-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated-air that is going to the producer; then electrically precipitating the tar from the gas; then passing the tar-freed producer-gas, at about its saturation-temperature, through a dilute acid-wash to absorb the ammonia from the gas; passing tar-freed coke-oven gas through an acid-wash supplied with dilute fresh acid-solution to absorb the ammonia; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the second gas-cooling operation; substantially as specified.

6. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then progressively cooling and concurrently electrically precipitating the tar from the gas; then passing the tar-freed producer-gas, at about its saturation-temperature, through an acid-wash to absorb the ammonia from the gas and precipitating water from such the gas; passing the tar-freed coke-oven gas through an acid-wash supplied with dilute fresh acid-solution to absorb the ammonia; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; conveying the acid-solution recovered from said saturation-bath back to the aforesaid producer-gas acid-wash; and conveying the saturated-air from said saturation-bath to the producer; the heat in the saturation-bath being mainly derived from the air, and the water-vapor for charging the air being mainly derived from the evaporation of the commingled mother-liquor in the saturation-bath; substantially as specified.

7. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then further cooling such gas by passing it in counter-current with the saturated-air that is going to the producer; then electrically precipitating the tar from the gas; then passing the tar-freed producer-gas, at about its saturation-temperature, through an acid-wash to absorb the ammonia from the gas; passing tar-freed coke-oven gas through an acid-wash supplied with dilute fresh acid-solution to absorb the ammonia; conveying the mother-liquor from the coke-oven gas acid-wash to the aforesaid producer-gas acid-wash; then conveying the commingled mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such commingled mother-liquor; and conveying the saturated-air from said saturation-bath to the second gas-cooling operation; substantially as specified.

8. In a process for the recovery of tar and ammonia from producer-gas and coke-oven gas simultaneously, the combination of steps that consists in: subjecting the hot producer-gas from the producer to a primary cooling operation by passing such gas in counter-current with water-charged air and thereby super-heating said air; then electrically precipitating the tar from the gas; then passing the tar-freed producer-gas, at about its saturation-temperature, through an acid-wash to absorb the ammonia from the gas; passing tar-freed coke-oven gas through an acid-wash supplied with dilute fresh acid-solution to absorb the ammonia; then conveying the mother-liquor containing the ammonia absorbed from both the coke-oven gas and the producer-gas to a saturation-bath; and passing the air, super-heated in the aforesaid primary cooling operation, through said saturation-bath to effect deposition of ammonium sulfate from such mother-liquor; reheating the saturated-air from said saturation-bath and conveying such air to the producer; substantially as specified.

9. In a process for the recovery of ammonia from two different ammonia-charged gases simultaneously, the combination of steps that consists in: subjecting the hot gas of one type to a primary cooling operation by passing such gas in counter-current with air and thereby super-heating said air; then passing such gas, at about its saturation-temperature, through an acid-wash to absorb the ammonia from the gas; passing tar-freed gas of the other type through an acid-wash to absorb the ammonia; conveying the mother-liquor from the acid-wash of both gases to a saturation-bath; and passing the air, super-heated in the aforesaid primary cooling operation, through said saturation-bath to effect deposition of ammonium sulfate from such mother-liquor; substantially as specified.

10. In a process for the recovery of ammonia from two different ammonia-charged gases simultaneously, the combination of steps that consists in: passing the gas of one type, at about its saturation-temperature, through an acid-wash to absorb the ammonia from the gas; passing the gas of the other type through an acid-wash to absorb the ammonia; conveying the mother-liquor from the acid-wash of both gases to a saturation-bath; and passing super-heated air through said saturation-bath to effect deposition of ammonium sulfate from such mother-liquor; substantially as specified.

11. In a process for the recovery of tar and ammonia from producer-gas, the combination of steps that consists in: subjecting the hot producer-gas from the producer to a primary cooling operation by passing such gas in counter-current with air and thereby super-heating said air; then progressively cooling and electrically precipitating the tar from the gas; then passing the tar-freed producer-gas, at about its saturation-temperature, through an acid-wash to absorb the ammonia from the gas and precipitating water from such gas; conveying the mother-liquor from such acid-wash to a saturation-bath; and passing the air, super-heated in the aforesaid primary cooling operation, through said saturation-bath to effect deposition of ammonium sulfate; and conveying the saturated-air from said saturation-bath to the producer; substantially as specified.

12. In a process for the recovery of tar and ammonia from producer-gas, the combination of steps that consists in: subjecting the hot producer-gas from the producer to a primary cooling operation by passing such gas in counter-current with air and thereby super-heating said air; precipitating the tar from the gas; then passing the tar-freed producer-gas, at about its saturation-temperature, through an acid-wash to absorb the ammonia from the gas and precipitating water from such gas; conveying the mother-liquor from such acid-wash to a saturation-bath; and passing the air, super-heated in the aforesaid primary cooling operation, through said saturation-bath to effect deposition of ammonium sulfate; and reheating the saturated-air from said saturation-bath; and conveying such air to the producer; substantially as specified.

13. In a process for the recovery of tar and ammonia from producer-gas, the combination of steps that consists in: subjecting the hot producer-gas from the producer to a primary cooling operation by passing such gas in counter-current with air and thereby super-heating said air; precipitating the tar from the gas; then passing the tar-freed producer-gas, at about its saturation-temperature, through a dilute acid-wash to absorb the ammonia from the gas; conveying the mother-liquor from such acid-wash to a saturation-bath; and passing the air, super-heated in the aforesaid primary cooling operation, through said saturation-bath to effect deposition of ammonium sulfate; reheating the saturated-air from said saturation-bath, and conveying such air to the producer; substantially as specified.

14. In a process for the recovery of tar and ammonia from producer-gas, the combination of steps that consists in: subjecting the hot producer-gas from the producer to a primary cooling operation; then electrically precipitating the tar from the gas and concurrently progressively cooling the gas, by passing such gas in counter-current with a cooling medium; and then passing the tar-freed producer-gas through an acid-wash to absorb the ammonia; substantially as specified.

15. In a process for the recovery of tar and ammonia from producer-gas, the combination of steps that consists in: subjecting the hot producer-gas from the producer to a primary cooling operation; then electrically precipitating the tar from the gas and concurrently progressively cooling the gas from a temperature above its saturation-temperature to a temperature about its saturation-temperature, by passing such gas in counter-current with a cooling medium; and then passing the tar-freed producer-gas, at about its saturation-temperature, through an acid-wash to absorb the ammonia; substantially as specified.

16. In a process for the recovery of ammonia from producer-gas, the combination of steps that consists in: passing tar-freed producer-gas, at about its saturation-temperature, through an acid-wash to absorb the ammonia from the gas and concurrently precipitating water from such gas; conveying the dilute mother-liquor from such acid-wash to a saturation-bath; passing super-heated air through said saturation-bath to effect deposition of ammonium sulfate, and saturate said air with substantially the full water content required for the production of said producer-gas; and then reheating the said air; and conveying it to the producer; substantially as specified.

17. In a process for the recovery of ammonia from producer-gas, the combination of steps that consists in: passing tar-freed producer-gas, at about its saturation-temperature, through an acid-wash to absorb the ammonia from the gas and concurrently precipitating water from such gas; conveying the dilute mother-liquor from such acid-wash to a saturation-bath; passing super-heated air through said saturation-bath to effect deposition of ammonium sulfate, and saturate said air with substantially the full water content required for the production of said producer-gas; and then conveying said air to the producer; substantially as specified.

In testimony whereof I have hereunto set my hand this 15th day of August, 1919.

JOSEPH van ACKEREN.